Dec. 29, 1931.    H. F. FISHER    1,838,923
DEHYDRATOR HAVING HYGROSCOPIC EMULSION INLET
Filed Sept. 16, 1926
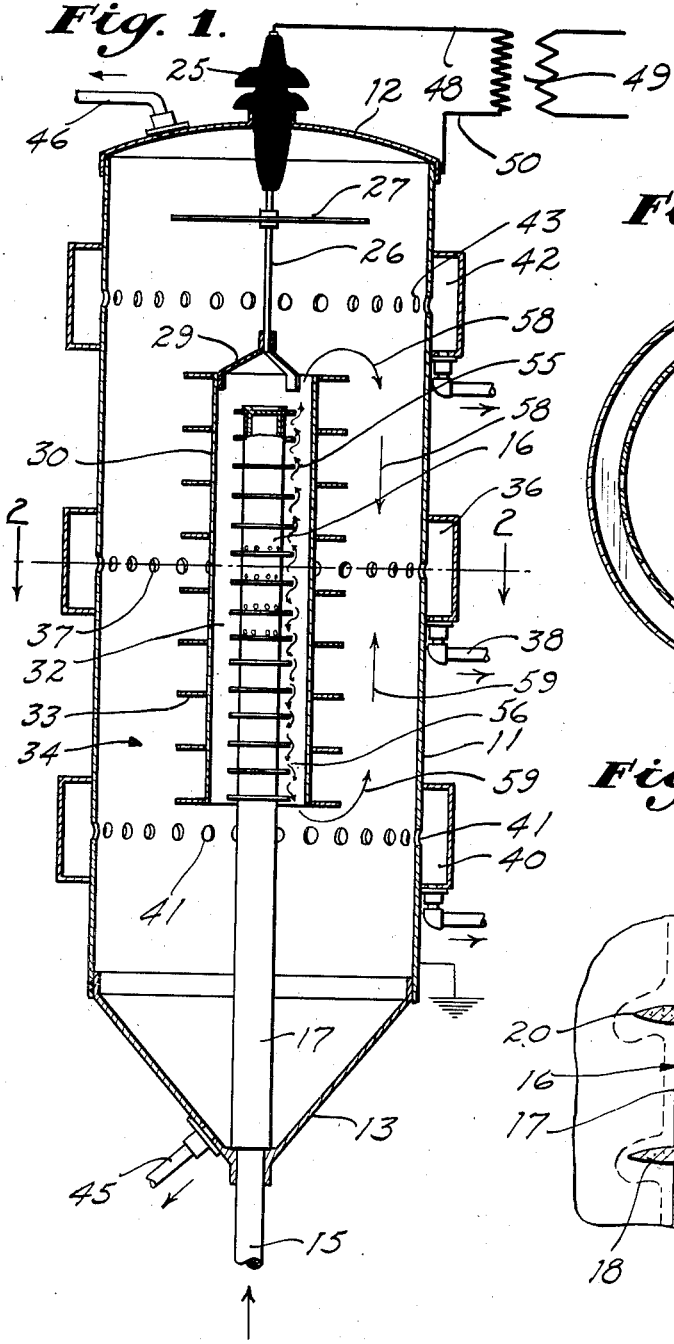
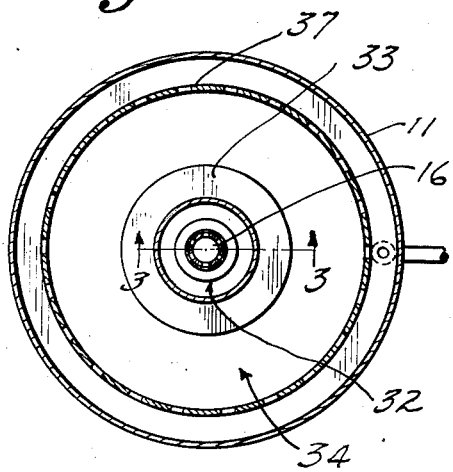
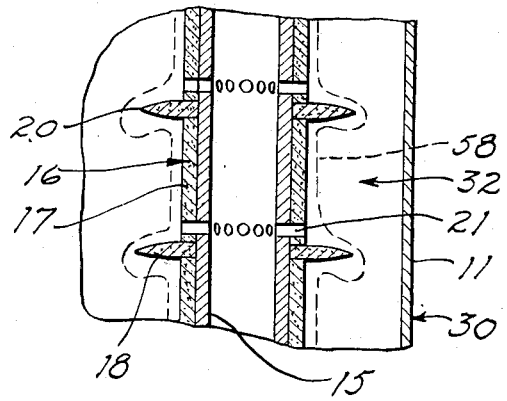
INVENTOR:
HARMON F. FISHER
BY
ATTORNEY.

Patented Dec. 29, 1931

1,838,923

UNITED STATES PATENT OFFICE

HARMON F. FISHER, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

DEHYDRATOR HAVING HYGROSCOPIC EMULSION INLET

Application filed September 16, 1926. Serial No. 135,803.

My invention relates to the art of dehydrating petroleum emulsions and relates particularly to a novel form of electrical dehydrator.

Oil as it is taken from a well carries small particles of water which cannot be separated therefrom by gravity; therefore the emulsion of oil and water must be subjected to a dehydrating treatment so that the particles of water will be coalesced. It is common practice to do this by use of an electrical dehydrator having a pair of electrodes between which an electric field is established. The emulsion is passed through the electric field wherein the water particles are agglomerated, by the action thereon of the electric field, into masses of sufficient size to gravitate from the oil.

It is an object of this invention to provide an improved electrical dehydrator which will very thoroughly and economically dehydrate petroleum emulsion.

Another object of the invention is to provide a simplified electrical dehydrator in which the emulsion will be passed through a plurality of treating zones.

It is another object of the invention to provide a dehydrator having a high tension electrode which is placed between a pair of grounded electrodes.

Other objects and advantages of the invention will be made evident hereinafter.

Referring to the drawings which are for illustrative purposes only,

Fig. 1 is a vertical section through the invention.

Fig. 2 is a section taken on the line 2—2 of Fig. 1.

Fig. 3 is an enlarged fragmentary section taken on the line 3—3 of Fig. 2.

The form of the invention disclosed in the drawings has a shell 11 having a tight top 12 and a tight conical bottom 13. Extended upward centrally through the bottom 13 into the interior of the shell 11 is an emulsion inlet pipe 15. The upper end of the emulsion inlet pipe 15 is provided in the form of a central grounded electrode 16. The grounded electrode 16, as illustrated in Fig. 3, is formed of sleeves 17 and discs 18 which are secured on the upper end of the pipe. The sleeves and discs 17 and 18 are formed of a material having an affinity for the emulsion, and preferably one having an affinity for the water phase of the emulsion such as plaster of Paris, and the discs 18 are provided with comparatively sharp annular edges 20. Emulsion passes outward through openings 21 formed in the pipe 15 and in the electrode, these openings being formed only near the center of the electrode 16.

An insulator 25 is supported by the top 12, and extended through the insulator 25 is a rod 26 supporting a plate 27. The lower end of the rod 26 is provided with a spider structure 29, to which a live high tension electrode 30 is attached. The live electrode 30 is provided in the form of a cylinder or sleeve and completely surrounds the central electrode 16, providing a primary treating space or passage 32. The live electrode 30 is provided with annular flanges 33 on its exterior, which project outward into a secondary treating space 34 which is formed between the live electrode 30 and the shell 11. This is only one form of construction, since good treating actions may be obtained if the live electrode be left plain and the corresponding annular flanges be placed on the inner face of the shell 11.

Near the middle of the shell 11 is an annular take-off trough 36 which is connected to the middle part of the secondary treating space 34 by means of openings 37. A pipe 38 is connected to the space provided by the trough 36. Near the lower part of the shell 11 below the electrodes 16 and 30 is a lower auxiliary trough 40 which is connected to the interior of the shell 11 by openings 41, and near the upper end of the shell 11 above the electrodes 16 and 30 is an upper auxiliary trough 42 which is connected to the interior of the shell through openings 43. The trough 36 is used during ordinary production and for experimental or testing purposes oil may be withdrawn through the upper or the lower auxiliary troughs.

Water which has been separated from the emulsion which is treated may be withdrawn from a water drain pipe 45 which connects to the interior of the apparatus through the tight bottom 13. A gas outlet 46 is provided which connects to the tight top 12. The rod 26 is connected to a conductor 48 which is extended to a transformer 49, and the shell 11 is connected to a conductor 50 which also extends to the transformer 49. The shell 11 is grounded and the central electrode 16 is also grounded by reason of the fact that it is supported by the emulsion inlet pipe 15 which is connected to the shell 11.

The operation of the invention is substantially as follows.

The emulsion to be treated is introduced into the treater through the emulsion inlet pipe 15. The emulsion flows from the inlet pipe 15 and also the central electrode 16 through the openings 21 which are formed near the central part of the central electrode 16. This emulsion passes through the treating space 32 in both directions, traveling in an upward direction as indicated by the arrows 55 and in a downward direction as indicated by the arrows 56.

The grounded electrode 16, since it is placed in the center of the apparatus, is the electrode of highest field intensity; therefore, the treatment in the primary treating space 32 will be very effectual. As previously mentioned, the central electrode 16 is formed of a material which has an affinity for water and will thus act as a guide for the emulsion due to the water content thereof. For this reason the water particles, as they coalesce, will hang to the central electrode, as indicated by dotted lines 57 of Fig. 3 following around the ledges formed by the discs 18. It is well known in the art that dehydration is much better and more rapidly accomplished if a high potential gradient field is established. I have found that by providing the discs 18 with the edges 20, zones around the edges 20 having a very high potential gradient may be provided. As the emulsion passes through these very high potential gradient zones, the water content thereof is coalesced by the dehydrating action which takes place.

The oil which passes upward from the top of the primary treating space 32 passes downward into the secondary treating space 34 as indicated by the arrows 58, and the oil which passes downward through the primary treating space 32 passes upward through the secondary treating space as indicated by the arrows 59. The water which has been separated from the oil falls and accumulates in the lower end of the treater, being withdrawn therefrom through the pipe 45.

The oil may not be entirely deprived of its water content when it passes into the secondary treating space 34; however, the further dehydrating action to which it is subjected in this space will entirely remove any remaining water content. The dry oil passes from the secondary treating space 34 through the opening 37 into the trough 36, and is then withdrawn through the pipe 38. The flanges 33 supported by the live electrode 30 form zones of high potential gradient through which the oil must pass and in which the remaining water particles are coalesced so that they will fall to the bottom of the treater.

For the purpose of experimenting and testing, the oil passing from the upper and lower ends of the primary treating space 32 may be sampled by withdrawing oil from the troughs 40 and 42. The disc 27 is of high potential and sets up a field between itself and the inner face of the shell 11. It is provided so that any oil passing to the upper end of the shell will be dehydrated so that no moisture may reach the insulator 25.

The important part of the invention is that the treater provides a pair of treating spaces through which the emulsion, during its process of dehydration, is passed. The simplified construction of the invention is very important. The ordinary dehydrator uses a central electrode which is maintained at a high potential above ground. In my invention the central electrode is grounded and I provide an intermediate electrode which is the live electrode. This makes a simplified construction for forming the primary and secondary treating spaces. The use of hygroscopic material for the electrode 16 is important and the use of the edges for providing localized fields of very high potential gradient is also an important feature.

I claim as my invention:

1. In a dehydrator of the class described: a primary electrode having a central cavity formed therein which is open at its ends; a secondary electrode extending into said cavity to form a relatively long and narrow emulsion treating passage; and means for introducing emulsion into said passage intermediate its ends.

2. In a dehydrator of the class described: a primary electrode having a central cavity formed therein which is open at its ends; a secondary electrode extending into said cavity to form a relatively long and narrow emulsion treating passage; and means for introducing emulsion into said passage substantially at the center thereof whereby said emulsion flows through said passage in two opposed directions.

3. In a dehydrator of the class described: a primary electrode having a central cavity formed therein which is open at its ends; a secondary electrode extending into said cavity to form a relatively long and narrow emulsion treating passage; means for introducing emulsion into said passage intermediate its ends, said secondary electrode having an emulsion guide for guiding said emulsion in a layer adjacent to said secondary electrode in its flow through said passage; and means associated with said secondary electrode for forming zones of maximum potential gradient at various intervals in said passage.

4. In a dehydrator of the class described: a primary electrode having a central cavity formed therein which is open at its ends; a secondary electrode extending into said cavity to form a relatively long and narrow emulsion treating passage; means for introducing emulsion into said passage intermediate its ends, whereby said emulsion flows through said treating passage in two directions; a tertiary electrode substantially surrounding said primary electrode to form a secondary passage connected at its ends with said treating passage; and means for withdrawing treated emulsion from said secondary passage at a point intermediate its ends.

5. In a dehydrator of the class described: a primary electrode having a central cavity formed therein which is open at its ends; a secondary electrode extending into said cavity to form a relatively long and narrow emulsion treating passage; means for introducing emulsion into said passage intermediate its ends; a shell electrically connected to said secondary electrode and substantially surrounding said primary electrode to form a secondary passage connected at its ends with said aforementioned passage; means provided upon the exterior of said primary electrode for forming zones of maximum potential gradient at various intervals in said secondary passage; and means for withdrawing treated emulsion from said secondary passage at a point intermediate its ends.

6. In a dehydrator of the class described: a primary electrode having a central cavity formed therein which is open at its ends; a secondary electrode extending into said cavity to form a relatively long and narrow emulsion treating passage; means for introducing emulsion into said passage intermediate its ends, said secondary electrode having an emulsion guide for guiding said emulsion in a layer adjacent to said secondary electrode in its flow through said passage; a tertiary electrode substantially surrounding said primary electrode to form a secondary passage connected at its ends with said aforementioned passage; and means for withdrawing treated emulsion from said secondary passage at a point intermediate its ends.

7. In a dehydrator of the class described: a primary electrode having a central cavity formed therein which is open at its ends; a secondary electrode extending into said cavity to form a relatively long and narrow emulsion treating passage; means for introducing emulsion into said passage intermediate its ends, said secondary electrode having an emulsion guide for guiding said emulsion in a layer adjacent to said secondary electrode in its flow through said passage; formations provided on said guide for forming zones of maximum potential gradient at various intervals in said passage; a tertiary electrode substantially surrounding said primary electrode to form a secondary passage connected at its ends with said aforementioned passage; means provided upon the exterior of said primary electrode for forming zones of maximum potential gradient at various intervals in said secondary passage; and means for withdrawing treated emulsion from said secondary passage at a point intermediate its ends.

8. In a dehydrator of the class described, the combination of: a primary electrode having a central cavity therein which is open at its ends; a secondary electrode extending into said cavity to form a treating space, said secondary electrode having an emulsion guide to which an emulsion may cling in moving in said space; and means for introducing said emulsion into said passage intermediate its ends.

9. In a dehydrator of the class described, the combination of: a primary electrode having a central cavity formed therein; and a hollow secondary electrode extending into said cavity, there being a treating space between said electrodes, said secondary electrode having openings therethrough communicating with that portion of said treating space lying immediately adjacent said secondary electrode.

10. A combination as defined in claim 9 in which said secondary electrode has annular ledges extending therefrom and toward said primary electrode, said openings being positioned immediately adjacent said ledges.

11. In a dehydrator of the class described, the combination of: a grounded shell; a live electrode in said shell, there being a treating space formed between said grounded shell and said live electrode and in which an emulsion is treated; an insulator electrically insulating said live electrode from said grounded shell; and a disc electrically connected to said live electrode above said treating space, said disc cooperating with said shell to prevent any untreated emulsion from reaching said insulator.

12. In a dehydrator of the class described: a primary electrode having a central cavity formed therein which is open at its ends; a secondary electrode extending into said cavity to form a relatively long and narrow emulsion treating passage; means for introducing emulsion into said passage intermediate its ends; a tertiary electrode substantially surrounding said primary electrode to form a secondary passage connected at its ends with said aforementioned passage; and an annular trough surrounding said tertiary electrode and communicating with said secondary passage to withdraw treated emulsion from said secondary passage intermediate its ends.

13. In a dehydrator of the class described, the combination of: a live electrode; a grounded electrode, there being a relatively long treating space between said electrodes; means for simultaneously introducing a fluid to be treated into said treating space at both ends thereof, there being one or more openings through one of said electrodes near the central portion of said treating space adapted to withdraw fluid from said treating space.

14. In a dehydrator, the combination of: a pair of cylindrical concentric electrodes defining a relatively long annular treating space therebetween open at opposite ends, one of said electrodes being impervious and the other providing openings at the central portion thereof to allow communication therethrough with said treating space.

15. In an electric treater, the combination of: a shell; an insulator extending through the upper end of said shell; a conductor extending through said insulator; means connected to said conductor for setting up an electric field in said shell; supply means for introducing an oil and water emulsion into said electric field whereby the oil is separated from the water and rises in said shell in communication with said insulator; and an auxiliary electrode means in the form of a disc positioned immediatelly below said insulator and above said electric field and supply means, said auxiliary electrode means being electrically connected to said conductor whereby an auxiliary field is set up between said shell and the edge of said disc through which auxiliary field the dry oil rising around said insulator must pass for further dehydration thereby preventing any untreated emulsion from reaching said insulator.

16. In a dehydrator of the class described, the combination of: a primary electrode having a central cavity open at its ends; a secondary electrode in said cavity and providing a pair of discs extending toward said primary electrode at a section intermediate said ends of said primary electrode; means for establishing a potential difference between said electrodes to set up intense fields between the edges of said discs and said primary electrode; and means for flowing the emulsion to be treated through said fields in opposite directions and from the ends of said primary electrode in opposite directions, said last named means including an introduction means supplying said emulsion to the space between said discs.

In testimony whereof, I have hereunto set my hand at Los Angeles, California, this 10th day of September, 1926.

HARMON F. FISHER.